United States Patent
Wakamura et al.

(10) Patent No.: US 10,906,029 B2
(45) Date of Patent: Feb. 2, 2021

(54) PHOTOCATALYST, PRODUCTION METHOD THEREOF, COMPONENT, AND DEVICE

(71) Applicants: FUJITSU LIMITED, Kawasaki (JP); Tokyo Institute of Technology, Tokyo (JP)

(72) Inventors: Masato Wakamura, Sakai (JP); Akira Nakajima, Meguro (JP); Noppakhate Jiraborvornpongsa, Meguro (JP)

(73) Assignees: FUJITSU LIMITED, Kawasaki (JP); TOKYO INSTITUTE OF TECHNOLOGY, Tokyo (JP)

(*) Notice: Subject to any disclaimer, the term of this patent is extended or adjusted under 35 U.S.C. 154(b) by 324 days.

(21) Appl. No.: 15/981,425

(22) Filed: May 16, 2018

(65) Prior Publication Data

US 2018/0333707 A1 Nov. 22, 2018

(30) Foreign Application Priority Data

May 19, 2017 (JP) .................. 2017-100184

(51) Int. Cl.
*B01J 27/198* (2006.01)
*B01J 27/19* (2006.01)
(Continued)

(52) U.S. Cl.
CPC ......... *B01J 27/198* (2013.01); *B01J 27/1806* (2013.01); *B01J 27/187* (2013.01);
(Continued)

(58) Field of Classification Search
CPC .... B01J 27/198; B01J 27/1806; B01J 27/187; B01J 27/19; B01J 27/199; B01J 35/002;
(Continued)

(56) References Cited

U.S. PATENT DOCUMENTS 7,468,172 B2 * 12/2008 Godber .................. A61K 9/143
423/308
7,579,296 B2 * 8/2009 Naganuma ........... B01D 53/885
423/308

(Continued)

FOREIGN PATENT DOCUMENTS

CN 10 9999868 * 7/2019 ............ B01J 27/175
JP 2000-327315 A 11/2000
(Continued)

OTHER PUBLICATIONS

Chun Hu et al., "Efficient destruction of bacteria with Ti(IV) and antibacterial ions in co-substituted hydroxyapatite films." Applied Catalysis B: Environmental 73, pp. 345-353. (Year: 2007).*
(Continued)

*Primary Examiner* — Patricia L. Hailey
(74) *Attorney, Agent, or Firm* — Kratz, Quintos & Hanson, LLP

(57) ABSTRACT

Provided is a photocatalyst including a photocatalyst in which part of calcium ions are substituted with titanium ions, and part of phosphoric acid ions are substituted with metal oxoacid ions in a calcium hydroxyapatite crystal structure.

11 Claims, 5 Drawing Sheets

(51) Int. Cl.
| | |
|---|---|
| *B01J 37/08* | (2006.01) |
| *B01J 35/00* | (2006.01) |
| *B01J 37/30* | (2006.01) |
| *B01J 27/187* | (2006.01) |
| *B01J 27/18* | (2006.01) |
| *B01J 27/199* | (2006.01) |
| *B01J 35/10* | (2006.01) |

(52) U.S. Cl.
CPC ............ *B01J 27/19* (2013.01); *B01J 27/199* (2013.01); *B01J 35/002* (2013.01); *B01J 35/004* (2013.01); *B01J 35/1014* (2013.01); *B01J 37/08* (2013.01); *B01J 37/30* (2013.01)

(58) Field of Classification Search
CPC ...... B01J 35/004; B01J 35/1014; B01J 37/08; B01J 37/30
USPC ................................. 502/208; 423/308, 309
See application file for complete search history.

(56) References Cited

U.S. PATENT DOCUMENTS

| | | | | |
|---|---|---|---|---|
| 8,431,753 | B2* | 4/2013 | Ozer ........................ | C07C 29/32 568/902 |
| 2006/0199729 | A1 | 9/2006 | Naganuma | |
| 2010/0150806 | A1* | 6/2010 | Godber ................ | A61K 9/2009 423/308 |
| 2012/0165577 | A1* | 6/2012 | Fagan ..................... | C07C 29/34 568/902.2 |
| 2015/0231606 | A1* | 8/2015 | Tsukada ................. | B01J 35/004 502/340 |

FOREIGN PATENT DOCUMENTS

| | | | | |
|---|---|---|---|---|
| JP | 2006-239514 | * | 9/2006 | ............ B01J 27/188 |
| JP | 2006-239514 A | | 9/2006 | |

OTHER PUBLICATIONS

Anmin Hu et al., "Preparation and Characterization of a titanium-substituted hydroxyapatite photocatalyst." Journal of Molecular Catalysis A: Chemical 267, pp. 79-85. (Year: 2007).*

Kana Ishisone et al., "Experimental and theoretical investigation of WOx modification effects on the photocatalytic activity of titanium-substituted hydroxyapatite." Applied Catalysis B: Environmental 264, pp. 1-12. (Year: 2020).*

Noppakhate Jiraborvornpongsa et al., "Effects of MoOx modification on photocatalytic activity of hydroxyapatite and Ti-doped hydroxyapatite." Advanced Powder Technology 30, pp. 1617-1624. (Year: 2019).*

Noppakhate Jiraborvornpongsa et al., "Preparation and photocatalytic activity of Mo-modified Ti-doped HAp." Applied Catalysis B: Environmental 243, pp. 448-454. (Year: 2019).*

Monika Supova et al., "Substituted hydroxyapatites for biomedical applications: A review." Ceramics International 41, pp. 9203-9231. (Year: 2015).*

A. Fujishima, et al., "Photocleaning revolution", CMC, 1997, pp. 85-87 (3 pages, 1 page translation, 4 pages total)/ p. 1 of Specification.

M. Wakamura, et al., "Photocatalysis by Calcium Hydroxyapatite Modified with Ti(IV): Albumin Decomposition and Bactericidal Effect", Langmuir, 19, 2003, pp. 3428-3431 (4 pages)/ p. 2 of Specification.

M. Tsukada, et al., "Band gap and photocatalytic properties of Ti-substituted hydroxyapatite: Comparison with anatase-TiO2", Journal of Molecular Catalysis A: Chemical, 338, 2011, pp. 18-23 (6 pages)/ p. 2 of Specifiation.

K. Kandori, et al., "Protein adsorption behaviors onto photocatalytic Ti(IV)-doped calcium hydroxyapatite particles", Colloiods and Surfaces B: Biointerfaces, 87, 2011, pp. 472-479 (2 cover pages, 8 pages, 10 pages total)/ p. 3 of Specifiation.

K. Kandori, et al., "Effects of Ti(IV) substitution on protein adsorption behaviors of calcium hydroxyapatite particles", Colloids and Surfaces B: Biointerfaces, 101, 2013, pp. 68-73 (1 cover page, 6 pages, 7 pages total)/ p. 3 of Specifiation.

A. Fujishima, et al., "Photocleaning revolution", CMC, 1997, pp. 15-36 (13 pages, 2 pages translation, 15 pages total)/ p. 3 of Specification.

M. Wakamura, "Development and Application of Titanium-doped Hydroxyapatite Photocatalyst", doctoral thesis for Graduate School of Tokyo Institute of Technology, Sep. 2014 (212 pages)/ p. 3 of Specifiation.

M. Nishikawa, et al., "Grafting effects of Cu2+ on the photocatalytic activity of titanium-substituted hydroxyapatite", Journal of Molecular Catalysis A: Chemical, 378, 2013, pp. 314-318 (5 pages)/ p. 5 of Specifiation.

Office Action of Japanese Patent Application No. 2017-100184: Notification of Reasons for Refusal dated Nov. 10, 2020 (3 sheets, 3 sheets translation, 6 sheets total).

* cited by examiner

PHOTOCATALYST, PRODUCTION METHOD THEREOF, COMPONENT, AND DEVICE

CROSS-REFERENCE TO RELATED APPLICATION

This application is based upon and claims the benefit of priority of the prior Japanese Patent Application No. 2017-100184, filed on May 19, 2017, the entire contents of which are incorporated herein by reference.

FIELD

The embodiments discussed herein are related to a photocatalyst, a production method of the photocatalyst, a component, and a device.

BACKGROUND

Titanium oxide ($TiO_2$) is widely known for a photocatalyst as a material for environmental remediation. When this material is irradiated with ultraviolet rays, electrons of the valence band are excited to the conduction band, and as a result, most of organic materials can be completely decomposed into carbon dioxide and water because of strong oxidizability of the holes remained in the valence band.

Since the photocatalytic reaction is a surface reaction, a decomposition reaction is not carried out unless a decomposition target is not present on the surface. Titanium oxide does not have high affinity to organic materials. In the case where a decomposition target is not easily adsorbed on a surface of the titanium oxide, therefore, a reaction speed is slow. In such a case, an adsorbent, such as activated carbon, has been used in combination with titanium oxide in the art, for the purpose of accelerating adsorption (see Akira Fujishima, Kazuhito Hashimoto, Toshiya Watanabe, "Photocleaning revolution," CMC, 85-87 (1997)). Use of the adsorbent in combination with titanium oxide accelerates adsorption, but reduces an area of the titanium oxide contributing to a photocatalytic reaction and reduces sites irradiated with light. Therefore, the use thereof becomes a factor for lowering decomposition efficiency, which has a trade-off relationship with the adsorption acceleration effect. Accordingly, it is desirable that a photocatalyst itself ideally has high affinity to organic materials.

In 2003, the research group of Wakamura et al. discovered first time in the world that a material in which Ti was introduced into an apatite ($Ca_{10}(PO_4)_6(OH)_2$) skeleton by doping (titanium apatite, may be referred to as "Ti-HAp" hereinafter) exhibited photocatalysis upon irradiation of ultraviolet rays (see Japanese Patent Application Laid-Open (JP-A) No. 2000-327315, and M. Wakamura, K. Hashimoto, T. Watanabe; "Photocatalysis by Calcium Hydroxyapatite Modified with Ti(IV): Albumin Decomposition and Bactericidal Effect", Langmuir, 19, 3428-3431 (2003)). It became clear from the researches that Ti-HAp had a structure that could be represented by $Ca_{10-x}Ti_x(PO_4)_6(OH)_2$ where part of Ca sites were substituted with Ti (see M. Wakamura, K. Hashimoto, T. Watanabe; "Photocatalysis by Calcium Hydroxyapatite Modified with Ti(IV): Albumin Decomposition and Bactericidal Effect", Langmuir, 19, 3428-3431 (2003), and M. Tsukada, M. Wakamura, N. Yoshida, T. Watanabe; "Band Gap and Photocatalytic Properties of Ti-Substituted Hydroxyapatite: Comparison with Anatase-$TiO_2$", Journal of Molecular Catalysis A: Chemical, 338, 18-23 (2011)), and a new level capable of absorbing ultraviolet rays of about 340 nm to about 350 nm was formed by Ti-doping to exhibit photocatalytic reaction (see M. Tsukada, M. Wakamura, N. Yoshida, T. Watanabe; "Band Gap and Photocatalytic Properties of Ti-Substituted Hydroxyapatite: Comparison with Anatase-$TiO_2$", Journal of Molecular Catalysis A: Chemical, 338, 18-23 (2011).).

Since Ti-HAp includes a structure of apatite that is a substance of human bones, Ti-HAp has high affinity to organic materials, such as proteins (K. Kandori, T. Kuroda, M. Wakamura; "Protein Adsorption Behaviors onto Photocatalytic Ti(IV)-doped Calcium Hydroxyapatite Particles", Colloids and Surfaces B: Biointerface, 87, 472-479 (2011). and K. Kandori, M. Oketani, M. Wakamura; "Effects of Ti(IV) Substitution on Protein Adsorption Behaviors of Calcium Hydroxyapatite Particles", Colloids and Surfaces B: Biointerfaces, 101, 68-73 (2013), and Ti-HAp is an extremely promising photocatalytic material that compensates disadvantages of titanium oxide. For the purpose of imparting antibacterial and antivirus properties, particularly, titanium oxide was often used in combination with a metal having antibacterial performance, such as Cu and Ag, in the art (see Akira Fujishima, Kazuhito Hashimoto, Toshiya Watanabe, "Photocleaning revolution," CMC, 15-36 (1997)). Main components of Ti-HAp are apatite and titanium oxide, both of which are safe to human bodies. Therefore, use of Ti-HAp for antibacterial and antivirus purposes has been increased, and realized as antibacterial processing for air cleaners, masks, kitchen products, stationary, carpets, etc. In fact, Ti-HAp exhibits high decomposition activity against *Escherichia coli*, pathogenic bacteria of plants, etc. (see Masato Wakamura, a doctoral thesis for Graduate School of Tokyo Institute of Technology, "Development and Application of Titanium-doped Hydroxyapatite Photocatalyst," September, 2014).

SUMMARY

According to one aspect of the present disclosure, a photocatalyst includes a photocatalyst, in which part of calcium ions are substituted with titanium ions and part of phosphoric acid ions are substituted with metal oxoacid ions in a calcium hydroxyapatite crystal structure.

According to one aspect of the present disclosure, a production method of a photocatalyst includes dipping calcium-titanium hydroxyapatite in a liquid including metal oxoacid ions to obtain a material, and firing the obtained material to obtain a photocatalyst. The calcium-titanium hydroxyapatite is obtained by substituting part of calcium ions in a calcium hydroxyapatite crystal structure with titanium ions.

According to one aspect of the present disclosure, a component includes the photocatalyst.

According to one aspect of the present disclosure, a device includes the photocatalyst.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
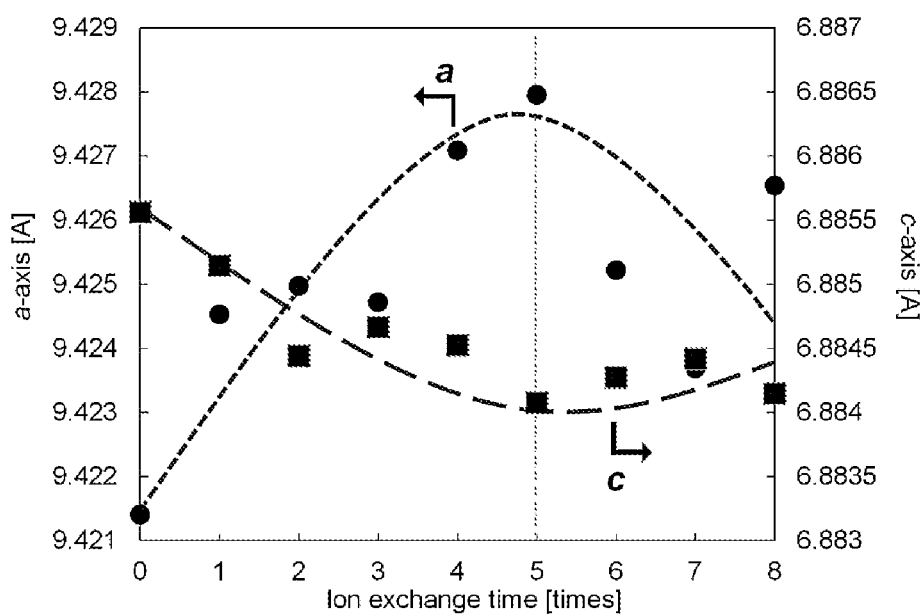
FIG. 1 is a graph depicting a relationship between the ion exchange time and lattice constants.
Figure 2A:
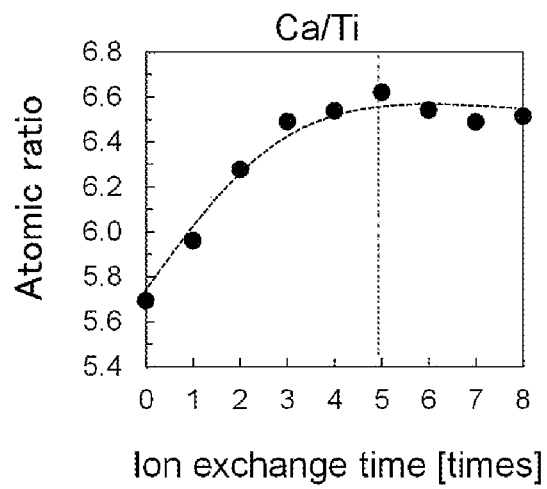
FIG. 2A is a graph depicting a relationship between the ion exchange time and Ca/Ti determined by x-ray photoelectron spectroscopy (XPS)
Figure 2B:
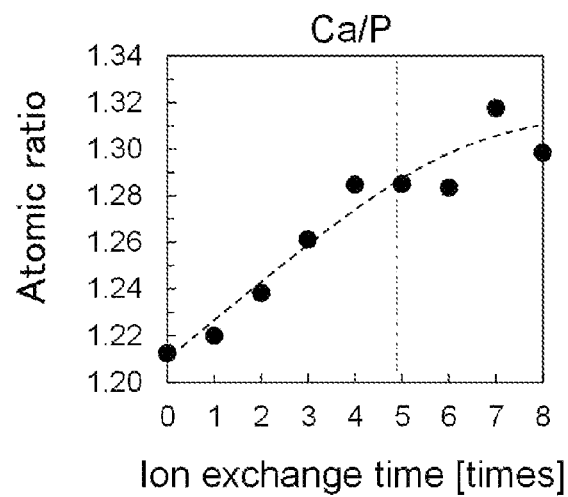
FIG. 2B is a graph depicting a relationship between the ion exchange time and Ca/P determined by XPS.
Figure 2C:
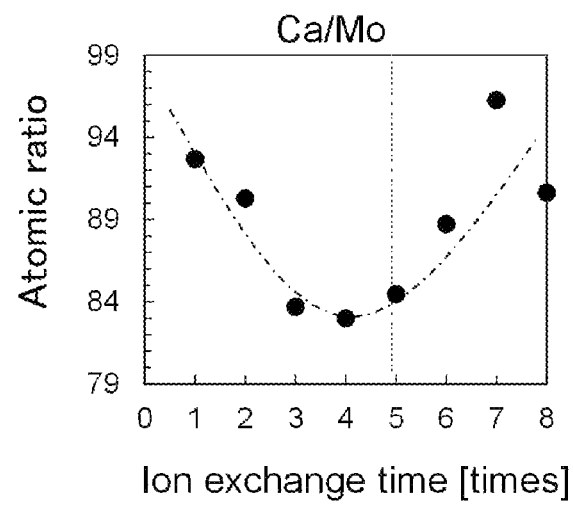
FIG. 2C is a graph depicting a relationship between the ion exchange time and Ca/Mo determined by XPS.
Figure 2D:
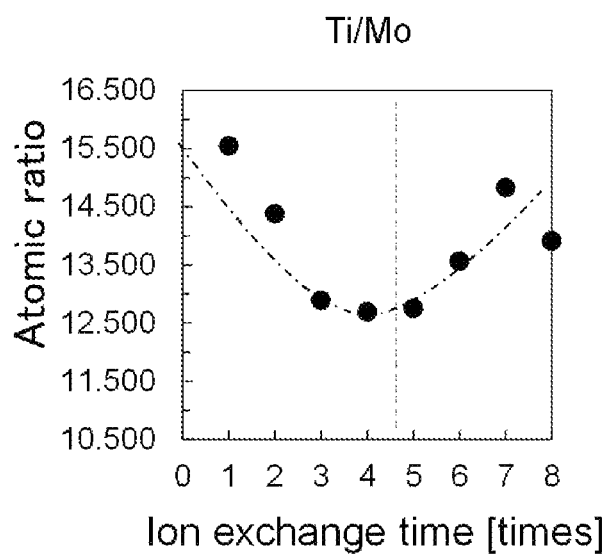
FIG. 2D is a graph depicting a relationship between the ion exchange time and Ti/Mo determined by XPS.
Figure 2E:
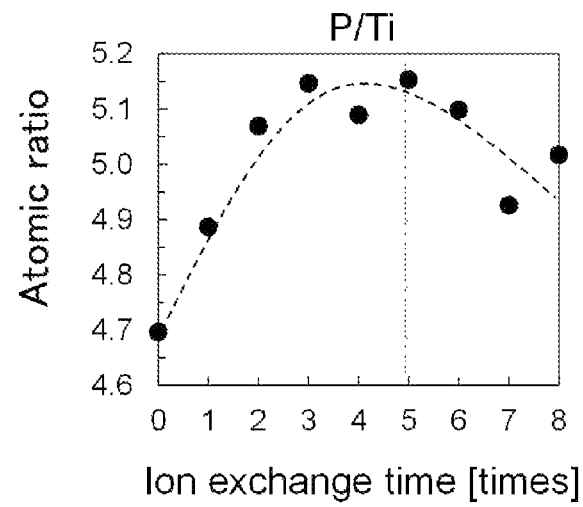
FIG. 2E is a graph depicting a relationship between the ion exchange time and P/Ti determined by XPS.
Figure 2F:
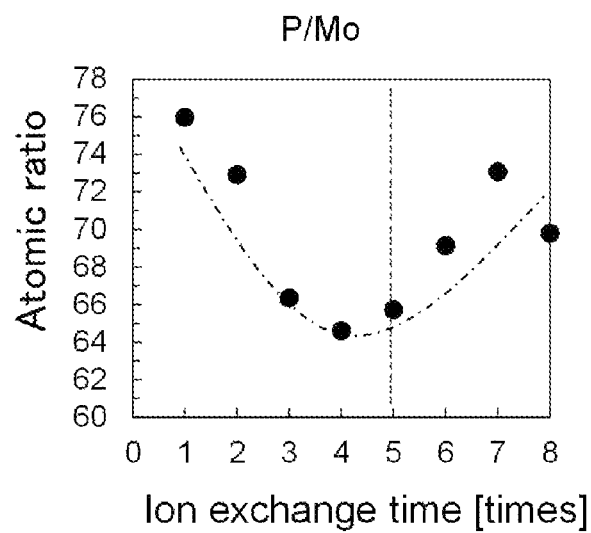
FIG. 2F is a graph depicting a relationship between the ion exchange time and P/Mo determined by XPS.

The photocatalytic activity of Ti-HAp is determined by a doping amount of Ti. In order to maintain a structure of apatite, the upper limit of the doping amount is roughly about 15% of Ca (see M. Tsukada, M. Wakamura, N. Yoshida, T. Watanabe; "Band Gap and Photocatalytic Properties of Ti-Substituted Hydroxyapatite: Comparison with Anatase-$TiO_2$", Journal of Molecular Catalysis A; Chemical, 338, 18-23 (2011)). Therefore, oxidizability of Ti-HAp itself is low compared to titanium oxide a crystal of which has a $TiO_6$ octahedral skeleton. Accordingly, high photocatalytic activity of Ti-HAp is owing to excellent adsorption power, which apatite originally has, to organic materials.

If oxidizability of Ti-HAp can be enhanced significantly, therefore, it is expected that a range of applications of Ti-HAp can be further widened. So far, in association with improvements of the activity of Ti-HAp upon irradiation of ultraviolet rays, a technology for bearing Cu clusters has been reported [see M. Nishikawa, W. Yang, Y. Nosaka, J. Molecular Catal A, 378, 314-318 (2013)]. However, the improvement of the activity remains about twice the activity of Ti-HAp bearing no Cu clusters.

The present disclosure has an object to provide a photocatalyst having excellent photocatalytic activity, a production method of the photocatalyst, and a component and device using the photocatalyst.

In one aspect of the present disclosure, a photocatalyst having excellent photocatalytic activity can be provided.

In one aspect of the present disclosure, moreover, a production method of a photocatalyst having excellent photocatalytic activity can be provided.

In one aspect of the present disclosure, moreover, a component including a photocatalyst having excellent photocatalytic activity can be provided.

In one aspect of the present disclosure, moreover, a device including a photocatalyst having excellent photocatalytic activity can be provided.

(Photocatalyst)

The disclosed photocatalyst is a photocatalyst, in which part of calcium ions are substituted with titanium ions and part of phosphoric acid ions are substituted with metal oxoacid ions in a calcium hydroxyapatite crystal structure.

In the photocatalyst, an amount of the titanium ions relative to the calcium ions is not particularly limited and may be appropriately selected depending on the intended purpose. In view of maintenance of the crystal structure of the apatite, the amount is preferably 20 mol % or less, more preferably 19 mol % or less, and particularly preferably 18 mol % or less.

The lower limit of the amount of the titanium ions relative to the calcium ions is not particularly limited and may be appropriately selected depending on the intended purpose. The lower limit is preferably 0.1 mol % or greater, more preferably 5 mol % or greater, even more preferably 10 mol % or greater, and particularly preferably 13 mol % or greater.

The metal oxoacid ion is an oxoacid anion of a transition metal element.

A metal included in the metal oxoacid ion is a transition metal.

Examples of the transition metal include tungsten (W), manganese (Mn), molybdenum (Mo), vanadium (V), niobium (Nb), tantalum (Ta), chromium (Cr), and rhenium (Re). The above-listed examples may be used alone or in combination.

Examples of the metal oxoacid ions include tungstate ions, manganate ions, molybdate ions, vanadate ions, tungstomolybdate ions, vanadomolybdate ions, vanadotungstate ions, manganese tungstate ions, cobalt tungstate ions, silicotungstate ions, and manganese molybdenum tungstate ions. Among the above-listed examples, molybdate ions ($MoO_4^{2-}$), manganate ions ($MnO_4^-$), and vanadate ions ($VO_4^{3-}$) are preferable.

The above-listed examples are used alone or in combination.

An amount of the metal oxoacid ions relative to the phosphoric acid ions in the photocatalyst is not particularly limited and may be appropriately selected depending on the intended purpose. The amount is preferably 0.1 mol % or greater but 5.0 mol % or less, more preferably 0.5 mol % or greater but 3.0 mol % or less, and particularly preferably 1.0 mol % or greater but 2.0 mol % or less.

<Shape Etc. Of Photocatalyst>

A shape, structure, and size of the photocatalyst are not particularly limited and may be appropriately selected depending on the intended purpose.

Examples of the shape include powderous shapes, granular shapes, tablet shapes, rod shapes, plate shapes, block shapes, sheet shapes, and film shapes. Among the above-listed examples, powderous shapes (powder) are preferable in view of handling.

Examples of the structure include needle structures, plate structures, dendritic structures, corrugated sheet structures, relief structures, single-layer structures, laminate structures, porous structures, and core-shell structures.

Note that, determination of the photocatalyst and observation of the form etc. of the photocatalyst can be performed, for example, by means of a transmission electron microscope (TEM), an X-ray diffraction (XRD) device, an X-ray photoelectron spectrometer (XPS), a Fourier transform infrared (FT-IR) spectrometer, an inductively coupled plasma-atomic emission spectrometer (ICP-AES), an X-ray fluorescence (XRF) spectrometer, etc.

Embodiment of Use

The photocatalyst may be used per se, or may be used in combination with another material, or may be used in the state of a slurry by dispersing the photocatalyst in a liquid substance, such as water, and alcohol-based solvents. In the case where the photocatalyst is used in the form of the slurry, the liquid is preferably water. The resultant slurry can be suitably used as a slurry including a photocatalyst.

The photocatalyst may be used per se, or may be used as a mixed composition by grinding and mixing the photocatalyst with another composition etc., or may be used by forming the photocatalyst into a film (surface coating film) on a base through deposition or coating. In the case where the photocatalyst is deposited or coated on a base etc., a coating liquid is suitably used.

A method of the grinding is not particularly limited and may be appropriately selected depending on the intended purpose. Examples of the method include methods where grinding is performed using a ball mill etc.

The above-mentioned another composition is not particularly limited and may be appropriately selected depending on the intended purpose. Examples of the composition include printing inks.

A method of the mixing is not particularly limited and may be appropriately selected depending on the intended purpose. Examples of the method include methods using kneaders, stirrers, etc.

A material, shape, structure, and thickness of the base are not particularly limited and may be appropriately selected depending on the intended purpose. Examples of the material of the base include paper, synthetic paper, woven fabrics, non-woven fabrics, leather, wood, glass, metals, ceramics, and synthetic resins. Examples of the shape of the base include foil shapes, film shapes, sheet shapes, and plate shapes.

A method of the deposition is not particularly limited and may be appropriately selected depending on the intended purpose. Examples of the method include spraying.

A method of the coating is not particularly limited and may be appropriately selected depending on the intended purpose. Examples of the method include spray coating, curtain coating, spin coating, gravure coating, inkjet, and dipping.

The coating liquid is not particularly limited and may be appropriately selected depending on the intended purpose, as long as the coating liquid includes the photocatalyst. Examples of the coating liquid include a coating liquid obtained by adding an alcohol solution, which is prepared by adding the photocatalyst into isopropyl alcohol etc., to an inorganic coating liquid material etc., and mixing the resultant mixture. The inorganic coating liquid material is not particularly limited and may be appropriately selected depending on the intended purpose. Examples of the inorganic coating liquid material include a cold setting inorganic coating agent (an agent obtained by mixing a liquid material of the product name, S00 and a liquid material of product name, UTE01, both available from Nihon Yamamura Glass Co., Ltd., at a mass ratio of 10:1).

<Applications Etc.>

The photocatalyst can be used for various applications of photocatalysts known in the art.

The photocatalyst can be suitably used in various fields. Specifically, the photocatalyst can be suitably used for OA devices (e.g., housings of computers, mouse, and keyboards), electronic devices (e.g., phones, photocopiers, facsimiles, various printers, digital cameras, video cassette recorders and players, CD recorders and players, DVD recorders and players, air conditioners, and remote controllable devices), electric appliances (e.g., dish washers, dish driers, tumble driers, washing machines, air cleaners, humidifiers, fans, extractor fans, vacuum cleaners, and kitchen waste disposal devices), mobile information terminals (e.g., PDA, mobile phones, and smart phones), filters (filters for gas: filters used for air cleaners, air conditioners, etc., filters for liquids: filters for hydroponic liquid treatments etc., filters for solids: filters for soil improvements etc., and filters for cameras), wall paper, food containers (e.g., reusable containers and disposal containers), medical devices and hygiene products (e.g., mask parts of oxygen inhalers, bandages, masks, and antibacterial gloves), textile products, such as clothes, dentures, interior and exterior materials (e.g., interior and exterior materials formed of resins, paper, cloth, ceramics, metals etc.; materials for bath, swimming pools, and buildings; and materials for medical facilities, bio experiment rooms, and clean benches, which apply light of a fluorescent lamp at the time of use by users, and apply ultraviolet rays when it is not used by users), vehicles (e.g., materials for interiors, and mirrors of vehicles for checking rear views), straps (e.g., straps for trains and buses), steering wheels and handles (steering wheels and handles for bicycles, tricycles, motor cycles, and automobiles), saddles (e.g., saddles for bicycles, tricycles, and motor cycles), shoes (e.g., shoes made of cloth, resins, artificial leather, and synthetic resins), bags (e.g., bags made of cloth, resins, artificial leather, and synthetic resins), coating materials (e.g., coating films), sewage and waste water treating materials (e.g., a material, in which a photocatalyst having absorbance to light of a wide range is blended in porous silica), a sheet (e.g., a soil treatment sheet), electrodes of biochips (e.g., electrodes in combination with organic dyes), mirrors (e.g., mirrors for bathrooms, mirrors for lavatory, dental mirrors, and road mirrors), lenses (e.g., spectacle lenses, optical lenses, lenses for lighting, lenses for semiconductor devices, lenses for photocopiers, and lenses for rear view cameras for vehicles), prisms, glass (e.g., window glass for buildings or watchtowers; window glass for vehicles, such as automobile, trains, aircrafts, ships, submersible, snowmobile, ropeway gondolas, gondolas for amusement parks, and spaceship; windshield glass for vehicles, such as automobile, trains, aircrafts, ship, submersible, snowmobile, ropeway gondolas, gondolas for amusement parks, and spaceship; glass of display cases for frozen food, and glass of display cases for heated food, such as Chinese steamed bun), goggles (e.g., protective goggles, and sports goggles), shields (e.g., shields for protective masks, shields for sports masks, and shields of helmets), covers (e.g., covers for measuring equipment, and covers of rear view cameras for automobiles), lenses (e.g., focusing lenses, such as for laser dental equipment), covers (e.g., covers of laser photodetecting sensors, such as a following distance sensors, covers of infrared sensors, films, sheets, stickers, and emblems).

A production method of the photocatalyst is not particularly limited and may be appropriately selected depending on the intended purpose. The photocatalyst is preferably produced by the production method described below.

(Production Method of Photocatalyst)

The disclosed production method of a photocatalyst includes at least a dipping and firing step, preferably further includes a repeating step, and may further include other steps according to the necessity.

The production method of a photocatalyst is suitable as a production method of the disclosed photocatalyst.

<Dipping and Firing Step>

The dipping and firing step is not particularly limited and may be appropriately selected depending on the intended purpose, as long as the dipping and firing step is a step including dipping calcium-titanium hydroxyapatite in a liquid including metal oxoacid ions to obtain a material and firing the obtained material.

<<Calcium-Titanium Hydroxyapatite>>

The calcium-titanium hydroxyapatite is a material in a state where part of calcium ions in a calcium hydroxyapatite crystal structure are substituted with titanium ions.

Examples of the calcium-titanium hydroxyapatite include $Ca_9Ti(PO_4)_6(OH)_2$ and $Ca_8Ti(PO_4)_6(OH)_2$.

The calcium-titanium hydroxyapatite may be synthesized or selected from commercial products. For example, the commercial products are readily available from Fuji Chemical Industries Co., Ltd. and TAIHEI CHEMICAL INDUSTRIAL CO., LTD.

In the calcium-titanium hydroxyapatite, an amount of the titanium ions relative to the calcium ions is not particularly limited and may be appropriately selected depending on the intended purpose. In view of maintenance of the crystal structure of the apatite, the amount is preferably 20 mol % or less, more preferably 19 mol % or less, and particularly preferably 18 mol % or less.

In the calcium-titanium hydroxyapatite, the lower limit of the amount of the titanium ions relative to the calcium ions is not particularly limited and may be appropriately selected depending on the intended purpose. The lower limit is preferably 0.1 mol % or greater, more preferably 5 mol % or greater, even more preferably 10 mol % or greater, and particularly preferably 13 mol % or greater.

<<Liquid>>

The liquid includes metal oxoacid ions. Examples of the liquid include aqueous solutions.

—Metal Oxoacid Ion—

The metal oxoacid ion is an oxoacid anion of a transition metal element.

A metal included in the metal oxoacid ion is a transition metal.

Examples of the transition metal include tungsten (W), manganese (Mn), molybdenum (Mo), vanadium (V), niobium (Nb), tantalum (Ta), chromium (Cr), and rhenium (Re). The above-listed examples may be used alone or in combination.

Examples of the metal oxoacid ions include tungstate ions, manganate ions, molybdate ions, vanadate ions, tungstomolybdate ions, vanadomolybdate ions, vanadotungstate ions, manganese tungstate ions, cobalt tungstate ions, silicotungstate ions, and manganese molybdenum tungstate ions. Among the above-listed examples, molybdate ions ($MoO_4^{2-}$), manganate ions ($MnO_4^-$), and vanadate ions ($VO_4^{3-}$) are preferable.

The above-listed examples may be used alone or in combination.

The liquid is obtained by dissolving a metal oxoacid salt in water.

A cation of the metal oxoacid salt is not particularly limited and may be appropriately selected depending on the intended purpose. Examples of the cation include alkaline earth metals, and alkali metals.

An amount of the metal oxoacid ions in the liquid is not particularly limited and may be appropriately selected depending on the intended purpose. The amount is preferably 0.01 mol/L or greater but 1 mol/L or less, and more preferably 0.05 mol/L or greater but 0.5 mol/L or less.

<<Dipping>>

A temperature of the liquid at the time of the dipping is not particularly limited and may be appropriately selected depending on the intended purpose. The temperature is preferably 20° C. or higher but 50° C. or lower, and more preferably 20° C. or higher but 30° C. or lower.

At the time of the dipping, the liquid is preferably stirred to turn the liquid into a suspension.

Duration of the dipping is not particularly limited and may be appropriately selected depending on the intended purpose. The duration is preferably 1 minute or longer but 1 hour or shorter.

A material obtained by the dipping may be washed and dried after the dipping but before the firing. Methods of the washing and the drying are not particularly limited and may be appropriately selected depending on the intended purpose.

<<Firing>>

A temperature of the firing is not particularly limited and may be appropriately selected depending on the intended purpose. The temperature is preferably 200° C. or higher but 600° C. or lower, and more preferably 400° C. or higher but 550° C. or lower.

Duration of the firing is not particularly limited and may be appropriately selected depending on the intended purpose. The duration is preferably 10 minutes or longer but 2 hours or shorter.

<Repeating Step>

The repeating step is not particularly limited and may be appropriately selected depending on the intended purpose, as long as the repeating step includes performing a step once or a plurality of times, where the step includes dipping the photocatalyst obtained from the dipping and firing step in a liquid including metal oxoacid ions to obtain a material and firing the obtained material. The step is preferably performed once to 4 times.

As conditions for the dipping and the firing, the conditions of the dipping and the conditions of the firing in the dipping and firing step are listed as examples.

A substitution amount of the metal oxoacid ions in the calcium-titanium hydroxyapatite can be increased by performing the dipping and the firing several times.

(Component)

The disclosed component includes the disclosed photocatalyst.

Within the component, the photocatalyst is, for example, formed into a film that constitutes part of the component.

Examples of the component include housings (e.g., housings of electronic components, electronic devices, electric appliances, and mobile information terminals), filters, wall paper, components of medical devices and hygiene products, lenses, prisms, and glass.

(Device)

The disclosed device includes the disclosed photocatalyst.

Within the device, the photocatalyst is, for example, arranged on a surface of housing of the device to constitute part of the device.

Examples of the device include OA devices (e.g., computers, tablets, mouse, and keyboards), vehicles (e.g., bicycles, automobiles, and trains), electronic devices (e.g., phones, photocopiers, facsimiles, various printers, digital cameras, video cassette recorders and players, CD recorders and players, DVD recorders and players, air conditioners, and remote controllable devices), electric appliances (e.g., dish washers, dish driers, tumble driers, washing machines, air cleaners, humidifiers, fans, extractor fans, vacuum cleaners, and kitchen waste disposal devices), and mobile information terminals (e.g., PDA, mobile phones, and smart phones).

EXAMPLES

The disclosed photocatalyst will be concretely described through examples hereinafter, but these examples shall not be construed as to limit a scope of the disclosed photocatalyst in any way.

In Examples below, each analysis was performed in the following manner.

<Measurement of Lattice Constants [XRD]>
Analysis device: XRD-6100 available from Shimadzu Corporation
Accelerating voltage: 40 kV
X-ray source: Cu <Surface Chemical Composition Analysis [XPS]>
Analysis device: ESCA 5500MT; Perkin Elmer Inc., U.S.A.
Accelerating voltage: 14 kV
X-ray source: Al Kα (1486.6 eV)

<Bulk Chemical Composition Analysis [ICP Analysis]>
Analysis device: 5100 VDV ICP-OES (Agilent Technologies)
Treatment of samples: Wet decomposition was performed with mixed acids of sulfuric acid, nitric acid, and hydrochloric acid for 9 hours.

Example 1

<Production of Photocatalyst>
In 200 mL of a $CaMoO_4$ aqueous solution (concentration: 0.1 mM), 1 g of commercially available Ti-HAp powder (available from Fuji Chemical Industries Co., Ltd.) including about 10 mol % of Ti relative to an amount of Ca was suspended for 5 minutes, and the resultant was filtered, washed, and dried, followed by firing the resultant for 1 hour at 500° C. in the atmosphere. The aforementioned process from the suspending through the firing was further performed on the resultant once to 7 times. As a result, photocatalyst powder samples whose ion exchange time was respectively once to 8 times were obtained.

<Analysis>
A specific surface area of any of the obtained powder samples was from 35 m$^2$/g to 40 m$^2$/g, and the crystal phase was an apatite single phase. However, the lattice constants of the appatite crystal (FIG. 1) and the surface chemical composition (FIGS. 2A to 2F) were changed by repeating the suspension through firing process. Since the lattice constants were changed, it was suggested that a certain amount of a material substitution occurred within the structure. It became clear from the change in the chemical composition that mainly $PO_4^{3-}$ was substituted with $MoO_4^{2-}$ during the first 5 repetitions of the process. No change was observed in the visible-ultraviolet ray absorption spectra of the samples.

It is assumed from the results above and the ICP analysis results that a general formula of the obtained photocatalyst is as follows.

$(Ca_{10-2x}Ti_{x-(y/4)}\blacktriangle_{x+(y/4)})(PO_4)_{6-y}(MoO_4)_y(OH)_2$

For example, 1.10≤x≤1.30, and 0<y≤0.100.
In the general formula above, ▲ denotes a void.

Moreover, relationships between the number of the times dipping and firing was performed (ion exchange time) and compositions of the obtained photocatalysts are as follows according to the XPS analysis results and the ICP analysis results.

TABLE 1

| Ion exchange time (times) | Chemical composition |
|---|---|
| 0 | $(Ca_{7.37}, Ti_{1.31}, \blacktriangle_{1.31})(PO_4)_6(OH)_2$ |
| 1 | $(Ca_{7.41}, Ti_{1.26}, \blacktriangle_{1.29})(PO_4)_{5.922}(MoO_4)_{0.078}(OH)_2$ |
| 2 | $(Ca_{7.51}, Ti_{1.21}, \blacktriangle_{1.25})(PO_4)_{5.919}(MoO_4)_{0.081}(OH)_2$ |
| 3 | $(Ca_{7.58}, Ti_{1.17}, \blacktriangle_{1.21})(PO_4)_{5.911}(MoO_4)_{0.089}(OH)_2$ |

TABLE 1-continued

| Ion exchange time (times) | Chemical composition |
|---|---|
| 4 | $(Ca_{7.62}, Ti_{1.14}, \blacktriangle_{1.19})(PO_4)_{5.909}(MoO_4)_{0.091}(OH)_2$ |
| 5 | $(Ca_{7.64}, Ti_{1.13}, \blacktriangle_{1.18})(PO_4)_{5.91}(MoO_4)_{0.09}(OH)_2$ |

<Photocatalytic Activity>
The obtained powder was collected by 40 mg. The collected powder was homogeneously dispersed in a region of 8.35 cm$^2$ to thereby obtain a sample. The sample was set in a 500 mL glass container, and ultraviolet rays (wavelength: 365 nm) having intensity of 1 mW/cm$^2$ was applied using a Hg—Xe lamp with adding isopropyl alcohol vapor in a manner that a gas phase concentration was to be 700 ppm. The gas inside the container was collected per certain period of time, and a concentration of $CO_2$ gas generated by decomposition of isopropyl alcohol was quantified by gas chromatography. The $CO_2$ generation amount per unit time (ppm/h) was calculated from the $CO_2$ generation amount measured from the start of light irradiation to 6 hours later.

Figure 3:
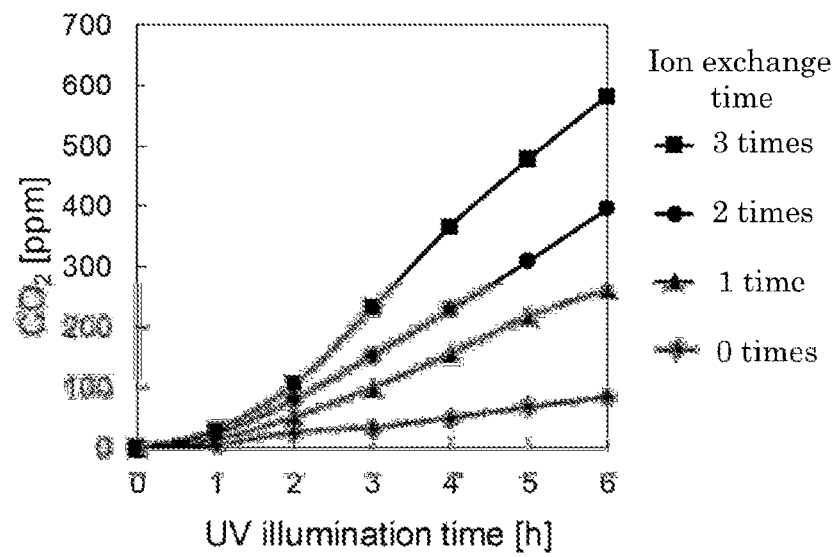
FIG. 3 is a graph depicting the transition of a $CO_2$ generation amount up to 3 times of the ion exchange time.
Figure 4:
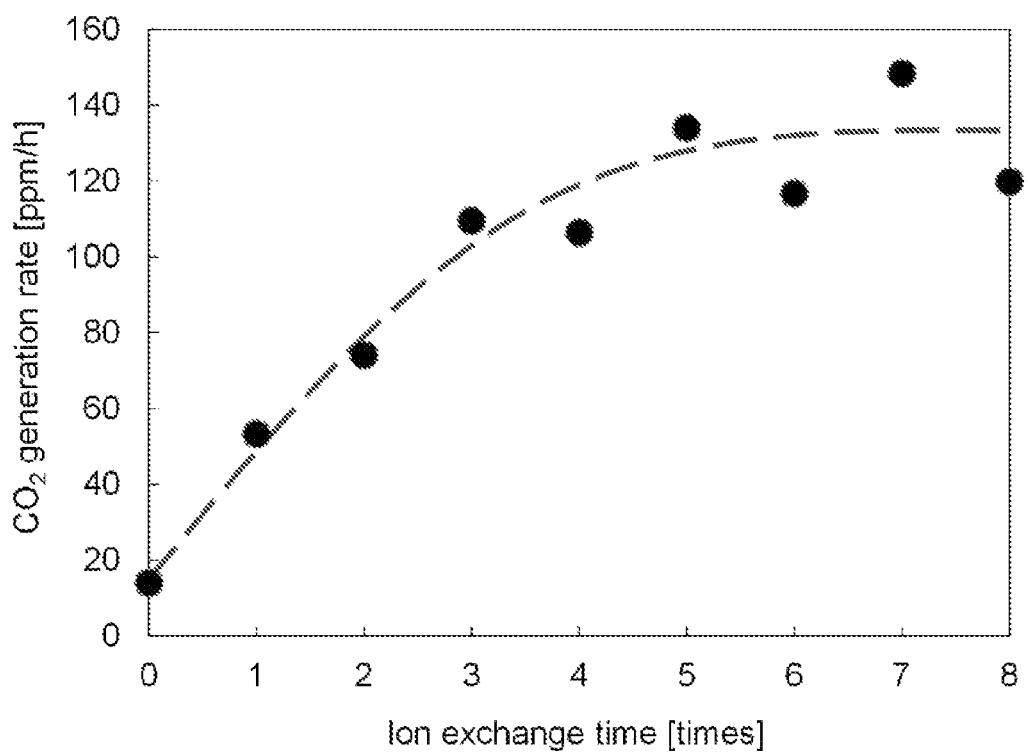
FIG. 4 is a graph depicting a relationship between the ion exchange time and a $CO_2$ generation amount per unit time.

The analysis results are presented in FIGS. 3 and 4. FIG. 3 is a graph depicting the transition of the $CO_2$ generation amount from the start to the repeating number (ion exchange time) of 3 times. FIG. 4 is a graph depicting a relationship between the ion exchange time and the $CO_2$ generation amount per unit time. FIG. 4 presents an average value obtained from the values obtained by measuring several times. The $CO_2$ generation rate increased along with the increase of the number of the ion exchange performed by the $CaMoO_4$ aqueous solution, and was almost saturated when the ion exchange was performed about 5 times. At the time of saturation, the $CO_2$ generation amount was about 140 ppm/h.

Example 2

<Production of Photocatalyst>
Samples were produced in the same manner as in Example 1, except that 200 mL of the $CaMoO_4$ aqueous solution (concentration: 0.1 mM) was replaced with 200 mL of a $KMnO_4$ aqueous solution (concentration: 0.1 mM).

<Analysis>
A specific surface area of any of the obtained powder samples was from 35 m$^2$/g to 40 m$^2$/g, and the crystal phase of each of the powder samples was an apatite single phase. No change was obtained in the visible-ultraviolet ray absorption spectra of the samples.

<Photocatalytic Activity>
Photocatalytic activity was evaluated in the same manner as in Example 1. The $CO_2$ generation rate was 48 ppm/h when the treatment with the $KMnO_4$ aqueous solution was performed once.

Example 3

<Production of Photocatalyst>
Samples were produced in the same manner as in Example 1, except that 200 mL of the $CaMoO_4$ aqueous solution (concentration: 0.1 mM) was replaced with 200 mL of a $Na_3VO_4$ aqueous solution (concentration: 0.1 mM).

<Analysis>
A specific surface area of any of the obtained powder samples was from 35 m$^2$/g to 40 m$^2$/g, and the crystal phase of each of the powder samples was an apatite single phase.

No change was obtained in the visible-ultraviolet ray absorption spectra of the samples.

<Photocatalytic Activity>

An evaluation of photocatalytic activity was performed in the same manner as in Example 1. The $CO_2$ generation rate when the treatment with the $Na_3VO_4$ aqueous solution was performed once was 133 ppm/h. When the $K_3VO_4$ aqueous solution was used, moreover, the $CO_2$ generation rate was 122 ppm/h, which was the similar value.

Comparative Example 1

<Photocatalytic Activity>

Photocatalytic activity of the commercially available Ti-HAp powder used in Example 1 was evaluated in the same manner as in Example 1. The $CO_2$ generation rate was about 14 ppm/h.

It was confirmed from Examples and Comparative Example above that Examples could effectively decompose and remove organic materials using a material in which Ti was introduced into the apatite (e.g., $Ca_{10}(PO_4)_6(OH)_2$) skeleton through substitution, where phosphoric acid ions therein were substituted with metal oxoacid ions. It was confirmed from the results above that a significant improvement in activity could be realized compared to Ti-HAp known in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. A photocatalyst comprising:
a photocatalyst in which part of phosphoric acid ions are substituted with metal oxoacid ions in calcium-titanium hydroxyapatite obtained by substituting part of calcium ions in a calcium hydroxyapatite crystal structure with titanium ions, the calcium-titanium h hydroxyapatite being expressed by $Ca_{10-x}Ti_x(PO_4)_6(OH)_2$, where x is $9.99 \times 10^{-3}$ or greater but 1.67 or less.

2. The photocatalyst according to claim 1,
wherein the x is 0.91 or greater but 1.60 or less.

3. The photocatalyst according to claim 1,
wherein the x is 1.15 or greater but 1.53 or less.

4. The photocatalyst according to claim 1,
wherein the metal oxoacid ions are at least one of tungstate ions, manganate ions, molybdate ions, vanadate ions, tungstomolybdate ions, vanadomolybdate ions, vanadotungstate ions, manganese tungstate ions, cobalt tungstate ions, silicotungstate ions, and manganese molybdenum tungstate ions.

5. The photocatalyst according to claim 1,
wherein the metal oxoacid ions are at least one of molybdate ions, manganate ions, and vanadate ions.

6. The photocatalyst according to claim 1,
wherein an amount of the metal oxoacid ions relative to the phosphoric acid ions is 0.1 mol % or greater but 5.0 mol % or less.

7. The photocatalyst according to claim 1,
wherein an amount of the metal oxoacid ions relative to the phosphoric acid ions is 1.0 mol % or greater but 2.0 mol % or less.

8. A production method of a photocatalyst, the method comprising:
dipping calcium-titanium hydroxyapatite in a liquid including metal oxoacid ions to obtain a material, where the calcium-titanium hydroxyapatite is obtained by substituting part of calcium ions in a calcium hydroxyapatite crystal structure with titanium ions, the calcium-titanium hydroxyapatite being expressed by $Ca_{10-x}Ti_x(PO_4)_6(OH)_2$, where x is $9.99 \times 10^{-3}$ or greater but 1.67 or less; and firing the obtained material to obtain a photocatalyst.

9. The production method according to claim 8, further comprising:
performing a step once or a plurality of times, where the step includes dipping the obtained photocatalyst in a liquid including metal oxoacid ions to obtain a material and firing the obtained material.

10. The production method according to claim 8,
wherein the metal oxoacid ions are at least one of molybdate ions, manganate ions, and vanadate ions.

11. A device comprising:
a photocatalyst,
wherein the photocatalyst is a photocatalyst in which part of phosphoric acid ions are substituted with metal oxoacid ions in calcium-titanium hydroxyapatite obtained by substituting part of calcium ions in a calcium hydroxyapatite crystal structure with titanium ions, the calcium-titanium hydroxyapatite being expressed by $Ca_{10-x}Ti_x(PO_4)_6(OH)_2$, where x is $9.99 \times 10^{-3}$ or greater but 1.67 or less.

* * * * *